United States Patent
Song et al.

(10) Patent No.: US 6,251,310 B1
(45) Date of Patent: Jun. 26, 2001

(54) METHOD OF MANUFACTURING A NUCLEAR FUEL PELLET BY RECYCLING AN IRRADIATED OXIDE FUEL PELLET

(75) Inventors: Kun-Woo Song; Keon-Sik Kim; Youn-Ho Jung; Myung-Seung Yang, all of Daejeon-Si (KR)

(73) Assignees: Korea Atomic Energy Research Institute, Daejeon-Si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/201,146

(22) Filed: Nov. 30, 1998

(30) Foreign Application Priority Data

Sep. 8, 1998 (KR) .................................................. 98-36913

(51) Int. Cl.$^7$ .................................................. G21C 21/00
(52) U.S. Cl. ........................................... 264/0.5; 264/37.1
(58) Field of Search ..................................... 264/0.5, 37.1

(56) References Cited

U.S. PATENT DOCUMENTS

| 3,641,227 | * | 2/1972 | Horsley et al. | 264/0.5 |
| 4,331,618 | * | 5/1982 | Hoyt | 264/0.5 |
| 5,882,552 | * | 3/1999 | Song et al. | 264/0.5 |

* cited by examiner

*Primary Examiner*—Christopher A. Fiorilla
(74) *Attorney, Agent, or Firm*—Arent Fox Kintner Plotkin & Kahn, PLLC

(57) ABSTRACT

A method of manufacturing new $UO_2$-based fuel pellets by recycling irradiated $UO_2$-based fuel pellets. Irradiated $UO_2$-based fuel pellets are oxidized so as to make $U_3O_8$-based powder, and then the $U_3O_8$-based powder is mixed with an additive which contains at least one oxide of an element selected from the group consisting of niobium, titanium, vanadium, aluminum, magnesium, chromium, silicon and lithium. Green pellets are formed from the mixed powder, and then sintered, preferably at 1500° C. or higher, in a reducing gas atmosphere to produce $UO_2$-based fuel pellets with high densities.

6 Claims, 1 Drawing Sheet

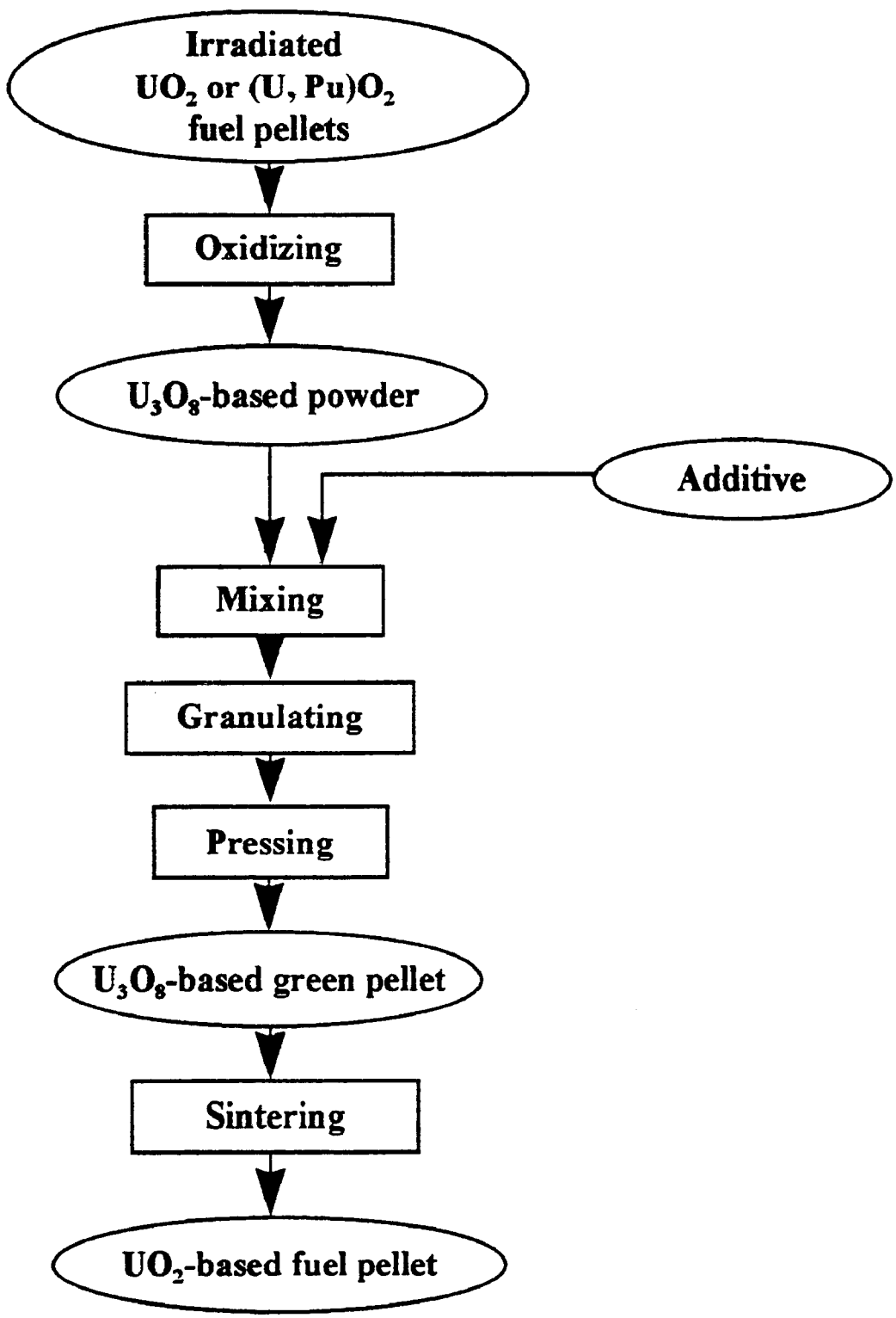

US 6,251,310 B1

METHOD OF MANUFACTURING A NUCLEAR FUEL PELLET BY RECYCLING AN IRRADIATED OXIDE FUEL PELLET

BACKGROUND OF THE INVENTION

1. Field of the Invention

This invention relates to a method of manufacturing $UO_2$-based fuel pellets by recycling irradiated $UO_2$-based fuel pellets. More particularly this invention relates to a method of making $U_3O_8$-based powder from irradiated $UO_2$-based fuel pellets, mixing the $U_3O_8$-based powder with an additive, pressing and sintering the product to produce the $UO_2$-based fuel pellets.

2. Definitions of Terminology

A fresh fuel pellet consists of uranium dioxide ($UO_2$) or a mixed oxide of uranium dioxide ($UO_2$) and plutonium dioxide ($PuO_2$), which mixed oxide is hereinafter referred to as "$(U, Pu)O_2$". In this application, the term "$UO_2$-based" refers to both $UO_2$- or $(U, Pu)O_2$-containing products, and the term "$U_3O_8$-based" refers to both $U_3O_8$- or $(U, Pu)_3O_8$-containing products.

3. Description of Related Art

As a $UO_2$-based fuel pellet is irradiated in a nuclear reactor, the fissile material in the fuel pellet is depleted and fission products are produced. An irradiated $UO_2$-based fuel pellet therefore comprises fissile materials and fission products, of which concentrations are mainly dependent on design burnup specifications and the initial amount of fissile materials. An irradiated fuel pellet discharged from a light water reactor normally has fissile materials of higher than 1% by weight of the irradiated fuel pellet, so it is worthwhile to recycled the fuel pellet for reuse.

According to the literature (G. E. Brand and E. W. Murbach, NAA-SR-11389 (1965)), a $UO_2$-based fuel pellet which has been irradiated in a light water reactor can be treated in a so-called AIROX cycle, to refabricate the $UO_2$-based fuel pellet. The AIROX cycle comprises the steps of oxidizing irradiated $UO_2$-based fuel pellets to $U_3O_8$-based powder, making sinterable $UO_2$-based powder from the $U_3O_8$-based powder, mixing the sinterable $UO_2$-based powder with enriched fresh $UO_2$ powder, making granules of the mixed powder, pressing the granules into green pellets, and sintering the green pellets to fabricate $UO_2$-based fuel pellets for reuse in a light water reactor.

The art discloses several methods of making sinterable $UO_2$-based powder from irradiated $UO_2$-based fuel pellets for use in the AIROX cycle. U.S. Pat. No. 3,140,151, discloses a method of making a sinterable $UO_2$-based powder comprising oxidizing the irradiated $UO_2$-based fuel pellet to $U_3O_8$-based powder in air at a temperature in the range of 300° C. to 500° C., reducing the $U_3O_8$-based powder to $UO_2$-based powder at a temperature in the range of 500° C. to 800° C., and repeating the oxidation and reduction steps 3 to 5 times to produce the sinterable $UO_2$-based powder. This $UO_2$-based powder was able to be sintered to produce $UO_2$-based fuel pellets.

A green pellet consisting of $U_3O_8$-based powder which is produced from irradiated $UO_2$-based pellets through one round of oxidation can be sintered only up to about 80% theoretical density (TD), and a fuel pellet having such a low density cannot be used in a nuclear reactor, since normal fuel design specifications require the pellet density to be at least about 94% TD. Therefore, oxidation and reduction of the $U_3O_8$-based powder needed to be conducted for many more rounds to enhance its sinterability. In addition, during the oxidation of $UO_2$-based pellets or powder to $U_3O_8$-based powder, the irradiated $UO_2$-based pellets or powder must be readily pulverized or comminuted to finer powder, since the phase transition of cubic $UO_2$ to orthorhombic $U_3O_8$ causes a volume expansion of about 30%, and thus large stress is generated.

A disadvantage of the prior art is that the oxidation and reduction of $UO_2$-based powder needs much time and is hard to control. For example, the oxidation rate of $UO_2$-based powder is very fast, and thus the heat produced from the resultant reaction can increase the temperature of the powder to high temperatures. The $UO_2$-based powder so produced is poorly sinterable.

SUMMARY OF THE INVENTION

An object of this invention is to provide a method of manufacturing $UO_2$-based fuel pellets by recycling irradiated $UO_2$-based fuel pellets.

With the foregoing object and other objects in view, there is provided in accordance with this invention a method of preparing $UO_2$-based fuel pellets, comprising oxidizing irradiated $UO_2$-based pellets to make $U_3O_8$-based powder; mixing the $U_3O_8$-based powder with an additive comprising at least one oxide of an element selected from the group consisting of Nb, Ti, V, Al, Mg, Cr, Si and Li; making granules of the mixture; pressing the granules into green pellets; and sintering the green pellets in a reducing gas atmosphere to produce new $UO_2$-based fuel pellets.

The method according to the invention is preferably conducted such that the additive is in the range of about 0.02% to about 5% by weight of the mixture. It is also preferable that the green pellets are sintered at a temperature above 1500° C.

In another method according to the invention, fresh $UO_2$-based powder is added to the $U_3O_8$-based powder to bring the amount of fissile materials within design specifications.

An advantage of the present invention is that the $U_3O_8$-based powder produced through a single oxidation treatment of irradiated $UO_2$-based pellets may be pressed without any further oxidation treatments being necessary, and sintered to make new $UO_2$-based fuel pellets. Accordingly, the 3–5 oxidation and reduction cycles which were necessarily required in the prior art are not needed in the present invention. Therefore, fuel manufacturing steps and related costs are much reduced by the present invention.

BRIEF DESCRIPTION OF THE DRAWING

The FIGURE shows the manufacturing steps in accordance with the present invention.

DETAILED DESCRIPTION OF THE INVENTION

An irradiated $UO_2$-based fuel pellet is first separated mechanically or physically from a cladding tube. Thereafter, the irradiated fuel pellet is processed through the manufacturing steps shown in FIG. 1.

The irradiated $UO_2$-based fuel pellet is oxidized in an oxidizing gas so as to make $U_3O_8$-based powder containing fission products. Then, the $U_3O_8$-based powder is mixed with an additive to form a mixture. The mixture is granulated into granules, which are then pressed into a green pellet. The green pellet is sintered in a reducing gas atmosphere, preferably at a temperature of at least 1500° C. for at least 1 hour. It is noted that irradiated (U, Pu)$O_2$ fuel pellets can be processed in the same way as irradiated $UO_2$ fuel pellets, since they each have the same crystal structure.

The detailed description of the method of manufacturing new UO2-based fuel pellets from irradiated $UO_2$-based fuel pellets is as follows.

The irradiated $UO_2$-based fuel pellet is heated in a furnace, preferably at a temperature in the range of about 300° C. to about 700° C., in an oxidizing gas. The oxidizing gas is preferably selected from the group consisting of air; oxygen; a mixture of air and inert gas; and a mixture of oxygen and inert gas. It has been found that the particle size of the $U_3O_8$-based powder increases with the oxidation temperature, so it is preferred to oxidize irradiated $UO_2$-based fuel pellets in air at a temperature in the range of about 350° C. to about 600° C. The irradiated $UO_2$-based fuel pellet is spontaneously pulverized to $U_3O_8$-based powder by the above treatment, since the lattice volume expands by about 30% and a large amount of stress is resultantly generated. The $U_3O_8$-based powder is preferably screened to remove large agglomerates or pellet fragments, and the $U_3O_8$-based powder so produced preferably has an average particle size of about 8 $\mu$m.

An irradiated $UO_2$-based fuel pellet has both gaseous fission products and solid fission products. Gaseous fission products include xenon and krypton, and solid fission products include Pu, Ce, Mo, Zr, Nd, Ba and La. While the gaseous fission products are almost completely removed from the irradiated fuel pellet during the above oxidation and pulverization steps, the resulting $U_3O_8$-based powder still contains amounts of the above-noted solid fission products. If the content of fissile materials in the $U_3O_8$-based powder is less than that required by the design specification of the fuel pellet to be manufactured, fresh $UO_2$-based powder, enriched or depleted, may be added to the $U_3O_8$-based powder in order to meet the amount of fissile materials required by the design specification. In this regard, it is useful to note that fresh $UO_2$ powder, fresh PuO2 powder or a mixed powder of $UO_2$ and PuO2 (i.e., (U, Pu)$O_2$) may be added for the same purpose. The addition of fresh $UO_2$-based powder to the $U_3O_8$-based powder enhances the density of the $UO_2$-based fuel pellet which will be manufactured, so there is no restriction on the amount of fresh $UO_2$ powder which may be added, from the viewpoint of pellet manufacturing.

In accordance with the present method, the $U_3O_8$-based powder is mixed with an additive comprising at least one oxide of an element selected from the group consisting of Nb, Ti, V, Al, Mg, Cr, Si and Li. The quantity of the additive is preferably in the range of about 0.02% to about 5% by weight of the mixture of the $U_3O_8$-based powder and the additive.

The mixture is thereafter preferably pre-pressed under about 1 ton/cm$^2$ of pressure into slugs, which are broken up into granules having good flowability. The granules are pressed in a mold, preferably under a pressure of higher than about 2 ton/cm$^2$, to produce a green pellet of about 40% to 70% TD. Before the pre-pressing or the pressing, a lubricant such as zinc stearate may optionally be added to the mixture to decrease the friction between particles during the pressing. A binder may also be added, if necessary, to increase the strength of the green pellet. If the mixture of the $U_3O_8$-based powder and the additive is flowable enough to be directly pressed, the mixture may be pressed into a green pellet without being granulated.

If lubricants or binders were added to the green pellet, the green pellet may, at this point in the process, be heated to a temperature of about 700° C. for a sufficient time to remove the lubricants or binders. If no lubricants or binders were added, this step is not necessary.

The green pellet is subsequently heated in a reducing gas atmosphere. In a first variation of the method, heating preferably is conducted at a temperature above about 1500° C. for at least 1 hour. The reducing gas atmosphere is needed to make a stoichiometric $UO_2$-based fuel pellet, so the reducing gas preferably comprises a gas selected from the group consisting of hydrogen, a mixed gas of hydrogen and at least one inert gas (such as argon and nitrogen), a mixed gas of hydrogen and steam, and a mixed gas of hydrogen and carbon dioxide.

Without the addition of additives in accordance with the present invention, a green pellet comprising the $U_3O_8$-based powder is sintered to a $UO_2$-based pellet having a density of only about 80% TD, due to the very low sinterability of the $U_3O_8$-based powder. A $UO_2$-based pellet with such a low density cannot be used in a nuclear reactor, because fuel specifications require the pellet density to be at least about 94% TD. With the addition of the additives in accordance with the present invention, a pellet density of at least about 94% TD may be achieved.

Another problem in achieving higher pellet density is the formation of micro-cracks in the green pellet during heating in the reducing gas. The reduction of orthorhombic $U_3O_8$-based compounds to cubic $UO_2$-based compounds results in a contraction of volume, which in turn causes micro-cracks to be formed in the green pellet since the volume contraction is not accommodated at relatively low temperatures. When the reduction of $U_3O_8$-based compounds to $UO_2$-based compounds is performed at a high temperature such that the volume contraction can be accommodated without cracking, the green pellet can be sintered to a higher density. Therefore, in a second variation of the method in accordance with the invention, before the sintering step the green pellet is first heated in a non-reducing gas (preferably to a temperature in the range of about 700° C. to 1100° C.), wherein the reduction of $U_3O_8$-based compounds to $UO_2$-based compounds is avoided, and then is sintered by heating to higher temperatures in a reducing gas (preferably to a temperature above about 1500° C. for at least 1 hour). $UO_2$-based pellets prepared by this variation on the present method have an even higher density than the $UO_2$-based pellet produced only in a reducing gas throughout the sintering step. Preferably, the non-reducing gas comprises at least one gas selected from the group consisting of an inert gas, nitrogen, carbon dioxide, air and steam.

A $UO_2$-based fuel pellet produced in accordance with the present invention has a density in the range of about 94% TD to about 98% TD. A $UO_2$-based fuel pellet which has a density between 94% TD and 96.5% TD is suitable for a light water reactor, and a $UO_2$-based fuel pellet which has a density between 96% TD and 98% TD is suitable for a heavy water reactor. Thus, the method provided by the present invention is able to fabricate fuel pellets suitable for both types of reactors.

The following examples illustrate preferred methods of fabricating $UO_2$-based fuel pellets in accordance with the present invention. However, these examples should be understood to in no way limit the scope of the invention, which is only defined by the appended claims.

EXAMPLE 1

A $UO_2$ fuel pellet irradiated to 35,000 MWD/MTU in a light water reactor has compositions of fissile materials and fission products. Their compositions are calculated with the ORIGEN computer code, and 12 major elements were selected from all the elements contained in the irradiated $UO_2$ fuel pellet. A simulated $UO_2$ fuel pellet having the same composition as the irradiated $UO_2$ fuel pellet was prepared using fresh $UO_2$ powder and the 12 non-radioactive fission products mentioned above. Fresh $UO_2$ powder was mixed with the pre-determined amounts of the 12 elements, and the composition of the mixed powder is shown in Table I.

TABLE I

| OXIDES | % BY WEIGHT |
| --- | --- |
| SrO | $9.147 \times 10^{-2}$ |
| $Y_2O_3$ | $5.488 \times 10^{-2}$ |
| $ZrO_2$ | $4.487 \times 10^{-1}$ |
| $MoO_3$ | $4.737 \times 10^{-1}$ |
| $RuO_2$ | $3.678 \times 10^{-1}$ |
| $Rh_2O_3$ | $4.814 \times 10^{-2}$ |
| PdO | $1.464 \times 10^{-1}$ |
| $TeO_2$ | $5.585 \times 10^{-2}$ |
| $BaCO_3$ | $2.552 \times 10^{-1}$ |
| $La_2O_3$ | $1.926 \times 10^{-1}$ |
| $CeO_2$ | $9.186 \times 10^{-1}$ |
| $Nd_2O_3$ | $6.605 \times 10^{-1}$ |
| $UO_2$ | 96.286 |

The mixed powder was ball-milled, pressed and sintered to make simulated $UO_2$ fuel pellets. The simulated $UO_2$ fuel pellets have a density of about 96% TD and have the same composition as the irradiated $UO_2$ fuel pellet, so it can be used as a substitute for the irradiated $UO_2$ fuel pellet. The simulated $UO_2$ fuel pellet does not emit radioactive rays, so it could be treated in an unshielded lab.

The simulated $UO_2$ fuel pellet was oxidized in flowing air at 400° C. for 3 hours to make $U_3O_8$-based powder, which was then passed through a sieve having 425 $\mu$m openings to remove large agglomerates. The $U_3O_8$-based powder had an average particle size of 8 $\mu$m.

The $U_3O_8$-based powder was mixed uniformly with niobium oxide ($Nb_2O_5$) as an additive, which quantity was 0.5% by weight of the $U_3O_8$-based powder. In parallel, the $U_3O_8$-based powder was mixed uniformly with titanium oxide ($TiO_2$) as an additive, which quantity was 0.2% by weight of the $U_3O_8$-based powder. The mixed powders were pre-pressed under a pressure of 98 MPa into slugs, which were then broken up into granules of 425 $\mu$m or smaller.

The granules were mixed with zinc stearate of 0.2% by weight of the granules for lubrication and were pressed into green pellets in a mold under pressures of 392 MPa, 490 MPa and 588 MPa. Green pellets were heated to 1700° C. in reducing gas atmospheres for 4 hours and then cooled-down to fabricate $UO_2$-based fuel pellets. During the heating process, the green pellet was sintered and simultaneously reduced from $U_3O_8$ to $UO_2$. The reducing gas was hydrogen for the green pellet containing $TiO_2$ and was a mixed gas of hydrogen and carbon dioxide for the green pellet containing $Nb_2O_5$.

Table II shows the densities of the $UO_2$-based fuel pellets fabricated in accordance with the above procedures. In order to show clearly the effect of the additives, a $U_3O_8$-based powder containing no additives was processed following the same procedure, and the density is also shown for comparison in Table II.

TABLE 11

| additives (wt %) | pressing pressure (MPa) | green density (g/cm³) | reducing gas atmosph (vol %) | sintered density (g/cm³) | sintered density (% TD) |
| --- | --- | --- | --- | --- | --- |
| 0.5% $Nb_2O_5$ | 392 | 5.56 | $H_2$ + 1% $CO_2$ | 10.119 | 94.39 |
| 0.5% $Nb_2O_5$ | 490 | 5.72 | $H_2$ + 1% $CO_2$ | 10.192 | 95.07 |
| 0.5% $Nb_2O_5$ | 588 | 5.86 | $H_2$ + 1% $CO_2$ | 10.261 | 95.72 |
| 0.5% $Nb_2O_5$ | 588 | 5.88 | $H_2$ + 2% $CO_2$ | 10.369 | 96.72 |
| 0.5% $Nb_2O_5$ | 588 | 5.87 | $H_2$ + 3% $CO_2$ | 10.314 | 96.21 |
| 0.2% $TiO_2$ | 588 | 5.96 | $H_2$ | 10.561 | 98.52 |
| not added* | 588 | 5.82 | $H_2$ | 8.0 | 74.6 |

*comparative example

EXAMPLE 2

$U_3O_8$-based powder was prepared in the same way as in Example 1. The $U_3O_8$-based powder was mixed with niobium oxide ($Nb_2O_5$), which contents were 0.3% and 0.5% by weight of the $U_3O_8$-based powder, respectively. In parallel, the $U_3O_8$-based powder was mixed with titanium oxide ($TiO_2$), which contents were 0.1% and 0.2% by weight of the $U_3O_8$-based powder, respectively. The mixed powders were pre-pressed under 98 MPa into slugs, which were then broken up into granules of 425 μm or smaller.

The granules were mixed with zinc stearate at 0.2% by weight of the granules for lubrication and were pressed into green pellets in a mold under 588 MPa. The green pellets were heated to 800° C., 900° C. and 1000° C. in argon gas, respectively, for 1 hour, and subsequently heated in reducing gas atmospheres to 1700° C. for 4 hours. The reducing gas was hydrogen for the green pellet containing $TiO_2$ and was a mixed gas of hydrogen and carbon dioxide for the green pellet containing $Nb_2O_5$.

Table III shows the densities of the $UO_2$-based pellets fabricated in accordance with the above procedures. In order to show clearly the effect of the additives, a $U_3O_8$-based powder containing no additives was processed following the same procedure, and the density is also shown for comparison in Table III.

TABLE III

| additives (wt %) | pressing pressure (MPa) | annealing of green pellets during heating (temp/gas/time) | reducing gas atmosh (vol %) | sintered density (g/cm³) | sintered density (% TD) |
|---|---|---|---|---|---|
| 0.3% $Nb_2O_5$ | 588 | 800° C./Ar/1 hr | $H_2$ + 2% $CO_2$ | 10.318 | 96.25 |
| 0.3% $Nb_2O_5$ | 588 | 900° C./Ar/1 hr | $H_2$ + 2% $CO_2$ | 10.520 | 98.13 |
| 0.3% $Nb_2O_5$ | 588 | 1000° C./Ar/1 hr | $H_2$ + 2% $CO_2$ | 10.300 | 96.08 |
| 0.5% $Nb_2O_5$ | 588 | 900° C./Ar/1 hr | $H_2$ + 2% $CO_2$ | 10.533 | 98.25 |
| 0.1% $TiO_2$ | 588 | 900° C./Ar/1 hr | $H_2$ | 10.465 | 97.62 |
| 0.2% $TiO_2$ | 588 | 900° C./Ar/1 hr | $H_2$ | 10.568 | 98.58 |
| not added* | 588 | 900° C./Ar/1 hr | $H_2$ + 2% $CO_2$ | 8.0 | 74.6 |

*comparative example

EXAMPLE 3

The $U_3O_8$-based powder was prepared in the same way as in Example 1. The $U_3O_8$-based powder was mixed with 0.5% niobium oxide ($Nb_2O_5$) and 0.4% titanium oxide ($TiO_2$) by weight of the $U_3O_8$-based powder, respectively. The mixed powder was pre-pressed at a pressure of 98 MPa into slugs, which were then broken up into granules of 425 μm or smaller.

The granules were mixed with zinc stearate at 0.2% by weight of the granules for lubrication and were pressed into green pellets in a mold under 588 MPa of pressure. The green pellets were heated to 1700° C. in a reducing gas atmosphere for 4 hours and then cooled-down. The reducing gas was a mixed gas of argon and hydrogen, and the hydrogen gas contained steam of 1.5% by volume of the hydrogen gas.

Table IV shows the densities of $UO_2$-based pellets fabricated in accordance with the above procedures. In order to show clearly the effect of the additives, $U_3O_8$-based powder containing no additives was processed following the same procedure, and the density of the pellet is also shown for comparison in Table IV.

TABLE IV

| additives (wt %) | pressing pressure (MPa) | green density (g/cm³) | reducing gas atmosph (vol %) | sintered density (g/cm³) | sintered density (% TD) |
|---|---|---|---|---|---|
| 0.4% $TiO_2$ | 588 | 5.95 | Ar + 5% $H_2$ | 10.270 | 95.80 |
| 0.5% $Nb_2O_5$ | 588 | 5.88 | Ar + 5% $H_2$ | 10.230 | 95.43 |
| not added* | 588 | 5.82 | Ar + 5% $H_2$ | 7.9 | 73.7 |

*comparative example

What is claimed is:

1. A method of producing a $UO_2$-based fuel pellet from an irradiated $UO_2$-based fuel pellet, the method comprising:

heating an irradiated $UO_2$-based fuel pellet in an oxidizing gas, to produce a $U_3O_8$-based product, mixing the $U_3O_8$-based product with an additive comprising at least one oxide of an element selected from the group consisting of Nb, Ti, V, Al, Mg, Cr, Si and Li, to produce a mixture, pressing the mixture into a green pellet, and sintering the green pellet in a reducing gas atmosphere to reduce the $U_3O_8$-based product to a $UO_2$-based product.

2. The method of claim 1, wherein said heating step is carried out at a temperature in the range of about 300° C. to about 700° C.

3. The method of claim 1, wherein said mixing step further comprises mixing fresh $UO_2$-based powder with the $U_3O_8$-based product, the additive or the mixture.

4. The method of claim 1, wherein the additive is mixed with the $U_3O_8$-based powder in an amount of about 0.02% to 5% by weight of the mixed powder.

5. The method of claim 1, wherein said sintering step comprises heating the green pellet to a temperature of at least 1500° C. for at least 1 hour in a reducing gas atmosphere.

6. The method of claim 1, wherein the reducing gas comprises at least one gas selected from the group consisting of (i) hydrogen, (ii) a mixture of hydrogen and at least one inert gas, (iii) a mixture of hydrogen and carbon dioxide, and (iv) a mixture of hydrogen and steam.

* * * * *